US008616614B2

(12) United States Patent
Ohtsubo et al.

(10) Patent No.: US 8,616,614 B2
(45) Date of Patent: Dec. 31, 2013

(54) ARMREST STRUCTURE FOR VEHICLE AND SETTING METHOD OF ARMREST HEIGHT FOR VEHICLE

(75) Inventors: Tomonori Ohtsubo, Hiroshima (JP); Isao Hirashima, Hiroshima (JP); Yoji Yatsushiro, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 112 days.

(21) Appl. No.: 13/349,721

(22) Filed: Jan. 13, 2012

(65) Prior Publication Data

US 2012/0193964 A1    Aug. 2, 2012

(30) Foreign Application Priority Data

Feb. 1, 2011   (JP) ................................. 2011-019605

(51) Int. Cl.
*B60J 5/00*   (2006.01)
(52) U.S. Cl.
USPC ........................ 296/153; 296/37.8; 296/24.34
(58) Field of Classification Search
USPC ...................... 296/153, 37.8, 24.34
See application file for complete search history.

(56) References Cited

U.S. PATENT DOCUMENTS

| 4,907,835 A | * | 3/1990 | Salters | .......................... 296/1.09 |
| 2009/0200831 A1 | * | 8/2009 | Motowski et al. | ............ 296/153 |

FOREIGN PATENT DOCUMENTS

JP    2010-221843 A   10/2010

* cited by examiner

*Primary Examiner* — Joseph Pape
(74) *Attorney, Agent, or Firm* — Studebaker & Brackett PC

(57) ABSTRACT

An armrest structure for a vehicle of the present invention comprises a first armrest to support an elbow of one of arms of a passenger seated in a seat and a second armrest to support an elbow of the other arm of the passenger. A horizontal distance W1 between a vertically-extending seat center line of the seat and an elbow's support position at the first armrest is greater than a horizontal distance W2 between the vertically-extending seat center line and an elbow's support position at the second armrest, and a height H1 of the elbow's support position at the first armrest is greater than a height H2 of the elbow's support position at the second armrest. Accordingly, the passenger's elbows can be properly supported at the armrests on both sides, in a seat width direction, of the seat.

17 Claims, 3 Drawing Sheets

ARMREST STRUCTURE FOR VEHICLE AND SETTING METHOD OF ARMREST HEIGHT FOR VEHICLE

BACKGROUND OF THE INVENTION

The present invention relates to an armrest structure for a vehicle and a setting method of an armrest height for a vehicle, which comprises a first armrest to support an elbow of one of arms of a passenger seated in a seat, the first armrest being provided on one side of the seat in a seat width direction, and a second armrest to support an elbow of the other arm of the passenger seated in the seat, the second armrest being provided on the other side of the seat in the seat width direction.

Conventionally, as disclosed in Japanese Patent Laid-Open Publication No. 2010-221843, a structure, in which a lid to open or close an upper face of a console box provided in a vehicle is used as an armrest and a height of the console box (the height of the armrest at the upper face of the console box) is changeable by using a spring to raise or lower the console box and a positioning mechanism to hold the console box at a specified height, is known.

According to the structure disclosed in the above-described patent document, the height of the armrest can be adjusted with a non-electrical, simple mechanism, and a passenger can be provided with appropriate elbow's support feelings by adjusting the armrest height in accordance with a passenger's body size or taste.

The above-described patent document, however, refers to nothing about positional relationships between the armrest and a seat in which the passenger is seated. Accordingly, even though the armrest height is changeable, there is a concern that in a case in which the position of the armrest in a vehicle width direction is extremely close to or far away from the seat, for example, the appropriate elbow's support feelings may not be provided to the passenger.

In particular, in a case in which armrests are provided on right and left sides of the seat (on both sides in the vehicle width direction), any difference in elbow's support feelings between the right side and the left side may cause some uncomfortable (inappropriate) feelings to the passenger.

SUMMARY OF THE INVENTION

The present invention has been devised in view of the above-described matters, and an object of the present invention is to ensure the appropriate elbow's support feelings by the armrests provided on the both sides of the seat.

The inventors of the present invention found that improvements of the elbow's support feelings by the armrests concerned a specified relationship of a horizontal distance between a vertically-extending seat center line (a line passing a center of the seat in the seat width direction) and a support position of the elbow at the armrest, and a height of the support position of the elbow at the armrest. Specifically, they found that the height of the elbow's support position was required to be set to be greater (higher) when the horizontal distance between the seat center line and the elbow's support position is greater (longer).

According to the present invention, there is provided an armrest structure for a vehicle, comprising a first armrest to support an elbow of one of arms of a passenger seated in a seat, the first armrest being provided on one side of the seat in a seat width direction, and a second armrest to support an elbow of the other arm of the passenger seated in the seat, the second armrest being provided on the other side of the seat in the seat width direction, wherein the first and second armrests are configured such that a horizontal distance between a vertically-extending seat center line passing a center of the seat in the seat width direction and a support position of the elbow at the first armrest is greater than that between the vertically-extending seat center line and a support position of the elbow at the second armrest, and a height of the support position of the elbow at the first armrest is greater than that of the support position of the elbow at the second armrest.

According to the present invention, since it is set such that the height of the first armrest having the greater (longer) horizontal distance from the vertically-extending seat center line is greater (higher) than that of the second armrest having the smaller (shorter) horizontal distance from the vertically-extending seat center line, an appropriate difference in the height between the first and second armrests can be provided in accordance with an increase of the armrest height when an outward angle of the upper arm portion of the seated passenger opens widely. Accordingly, the passenger's elbows can be properly supported at the first and second armrests regardless of the difference in the horizontal distance between the first armrest and the second armrest. Thereby, even when the passenger places the elbow on any of the first and second armrests, the appropriate elbow's support feelings can be ensured for the passenger and the passenger can obtain a more comfortable position.

According to an embodiment of the present invention, a height of each of the elbow's support positions at the first and second armrests is set at a level corresponding to a locus of a rotational motion of an upper arm portion of the arm of the passenger seated in the seat, the locus of the rotational motion of the upper arm portion of the passenger's arm being formed by the elbow when the upper arm portion of the passenger's arm rotates, in a vehicle width direction, around a shoulder position of the passenger seated in the seat. Thereby, the height of each of the first and second armrests can be set properly in accordance with the locus of the rotational motion of the passenger's upper arm portion, so that the appropriate elbow's support feelings at the first and second armrests can be ensured more properly.

According to another embodiment of the present invention, the first and second armrests are positioned such that a difference in height between the elbow's support position at the first armrest and the elbow's support position at the second armrest: H1−H2 (mm) is satisfied by the following expression (1), $$H1 - H2 = L\left[\cos\left\{\sin^{-1}\left(\frac{W2-W0}{L}\right)\right\} - \cos\left\{\sin^{-1}\left(\frac{W1-W0}{L}\right)\right\}\right] \pm 5 \quad (1)$$

Herein, L is a length (mm) of the upper arm portion of the arm of the passenger seated in the seat, W0 is a horizontal distance (mm) between the vertically-extending seat center line and the shoulder position of the passenger seated in the seat, W1 is a horizontal distance (mm) between the vertically-extending seat center line and the elbow's support position at the first armrest, and W2 is a horizontal distance (mm) between the vertically-extending seat center line and the elbow's support position at the second armrest. Thereby, the height of each of the first and second armrest can be properly set regardless of a value of the horizontal distance of the respective armrests or a model to be used as a body size of the passenger seated in the seat.

Herein, while such a model to be used as the body size of the passenger for determination of the height of the first and second armrests can be adopted in accordance with the kind of vehicle or markets, AM50 Model (an average body size of American male adults) from body-model standards, for example, may be properly adopted as such a model.

According to another embodiment of the present invention, an operational portion for seat-position adjustment is provided at a side face of the seat which is located on the one side of the seat in the seat width direction where the first armrest is provided, and the second armrest is located on the other side of the seat which is opposite to the operational portion for seat-position adjustment. Thereby, a necessary space for the passenger operating the operational portion for seat-position adjustment with a hand can be provided properly, ensuring the appropriate elbow's support feelings at the first and second armrests.

Herein, while any kinds of armrest may be used as the first and second armrests as long as they are provided on the both sides of the seat in the seat width direction, there can be provided a preferable example, in which the first armrest is a door armrest provided at a door trim of a side door which is located on an outside, in a vehicle width direction, of the seat, and the second armrest is a center armrest provided at an upper face of a center console which is located on an inside, in the vehicle width direction, of the seat.

According to another embodiment of the present invention, at least one of the first and second armrests is configured such that the height thereof is changeable within a specified adjustable range and a highest position in the specified adjustable range corresponds to the elbow's support position located on the locus of the rotational motion of the upper arm portion of the passenger seated in the seat. Thereby, in a case in which the height of at least one of the first and second armrests is changeable, the height of the armrest can be easily adjusted to an appropriate position to support the passenger's elbow by the passenger raising the armrest up to the highest position, and when the armrest is not used, the armrest can be properly lowered so as not to hinder the passenger in his/her driving.

Further, according to another aspect of the present invention, there is provided a setting method of an armrest height for a vehicle which comprises a first armrest to support an elbow of one of arms of a passenger seated in a seat, the first armrest being provided on one side of the seat in a seat width direction, and a second armrest to support an elbow of the other arm of the passenger seated in the seat, the second armrest being provided on the other side of the seat in the seat width direction, the setting method comprising setting a height of each of the elbow's support positions at the first and second armrests at a level corresponding to a locus of a rotational motion of an upper arm portion of the arm of the passenger seated in the seat, the locus of the rotational motion of the upper arm portion of the passenger's arm being formed by the elbow when the upper arm portion of the passenger's arm rotates, in a vehicle width direction, around a shoulder position of the passenger seated in the seat. According to the present setting method of the height of the first armrest or the second armrest, substantially the same operations and effects as those by the above-described armrest structure can be provided.

Other features, aspects, and advantages of the present invention will become apparent from the following description which refers to the accompanying drawings.

DETAILED DESCRIPTION OF THE INVENTION

Hereafter, a preferred embodiment of the present invention will be described referring to the accompanying drawings.

Figure 1:
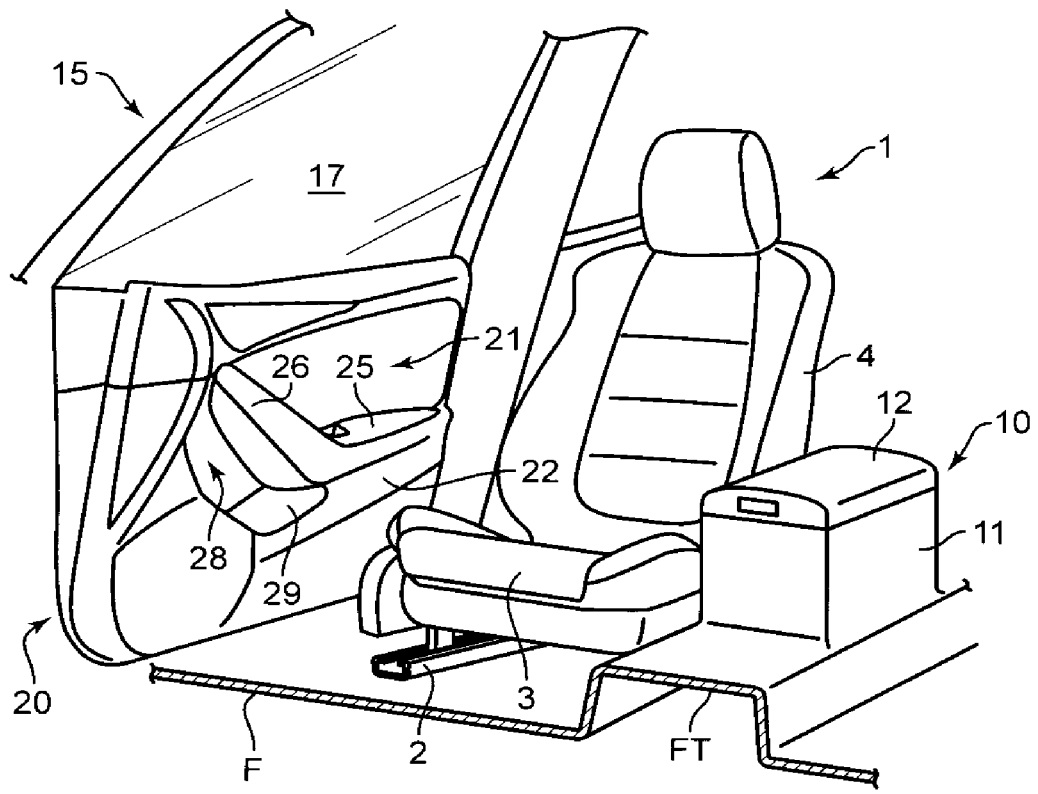
FIG. 1 is a perspective view of a vehicle compartment of a vehicle equipped with an armrest structure according an embodiment of the present invention, when viewed obliquely from a vehicle front.
Figure 2:
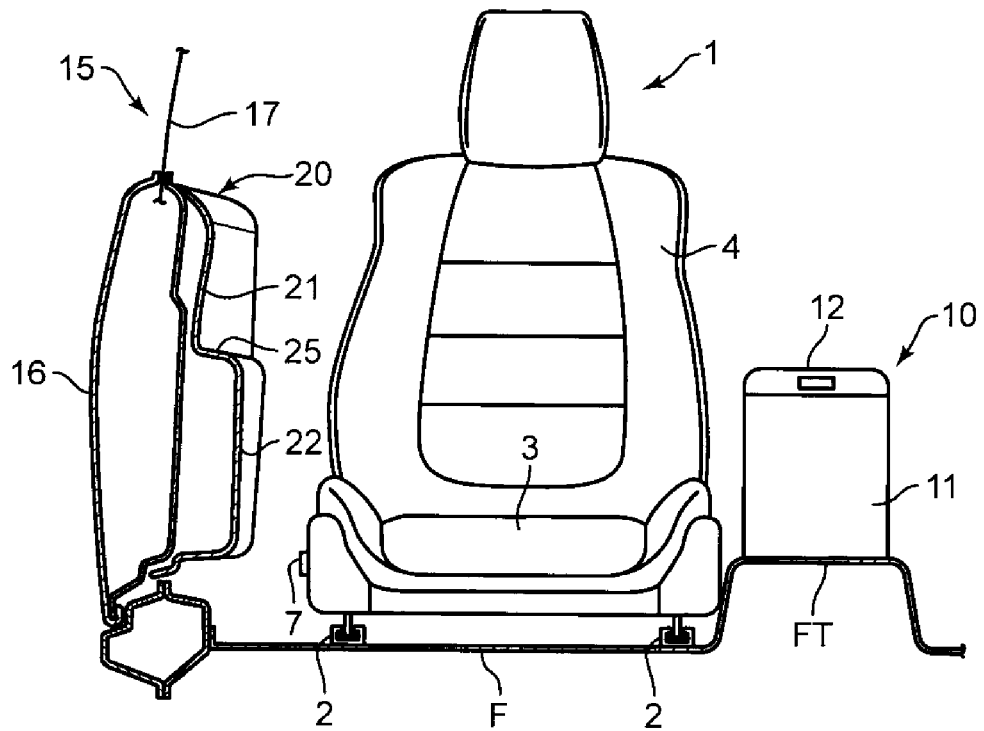
FIG. 2 is an elevational view of the vehicle compartment, when viewed from the vehicle front.

FIGS. 1 and 2 show a state of a vehicle compartment of a vehicle equipped with an armrest structure according to an embodiment of the present invention. As shown in FIGS. 1 and 2, a driver's seat 1 (hereinafter, referred to as a seat 1 simply) in which a passenger (driver) driving the vehicle is seated is provided on a floor F of the vehicle compartment.

The seat 1 comprises a seat cushion 3 which is supported to slide longitudinally on the floor F via a pair of seat slide rails 2, and a seatback 4 which is provided to rise upwardly from a rear end portion of the seat cushion 3. The seatback 4 is pivotally supported at the seat cushion 3 via a reclining mechanism, not illustrated, so that a rearward-inclined angle of the seatback 4 is changeable within a specified range in accordance with an operation of the reclining mechanism.

An operational portion 7 for seat-position adjustment is provided at a side face of the seat cushion 3 which is located on the right side of the vehicle (on the side where a side door 15, which will be described later, is arranged). In a case in which the seat 1 is an electromotive seat, for example, various types of operational switch to adjust a longitudinal position (a slide position on the seat slide rails 2) of the seat cushion 3 and the rearward-inclined angle of the seatback 4 are provided as the above-described operational portion 7.

A floor tunnel FT is provided at a central portion of the floor F in the vehicle compartment, which is located on the inside of the seat 1, to project upwardly and extend longitudinally, and a center console 10 is provided on the floor tunnel FT. The center console 10 comprises a box-shaped console body 11 which has a storage space of objects and the like therein, and a lid portion 12 which opens or closes an upper face of the console body 11.

An opening for ingress and egress of the passenger (driver), not illustrated, is formed at a one-side face (right side face) of the vehicle which is located on the outside of the seat 1, and a side door 15 is provided to open or close this opening.

The side door 15 comprises a door body 16 which is made of metal-made panel members (an outer panel and an inner panel) joined together in the vehicle width direction or the like, a door trim 20 which is made of a resin-made panel member covering an inside face of the door body 16, and a window glass (windowpane) 17 which is supported at the door body 16 so as to rise or lower.

The door trim 20 has a concave portion 21 which is formed by an upward-and-rearward specified area concaved toward the vehicle outside, and a protrusion portion 22 which is formed by a portion below the concave portion 21 projected relatively toward the vehicle inside. A self portion 25 which extends substantially flatly and longitudinally is formed at a position between the protrusion portion 22 and the concave portion 21. A slant projection portion 26 which extends obliquely upwardly is formed in front of the shelf portion 25 continuously from a front end portion of the self portion 25, and a front side portion of the above-described concave portion 21 is partitioned by the slant projection portion 26. Further, a front concave portion 28 which is concaved toward the vehicle outside is formed in front of the slant projection portion 26, and a door pocket 29 which has an opening portion opening upwardly is formed below the front concave portion 28.

Figure 3:
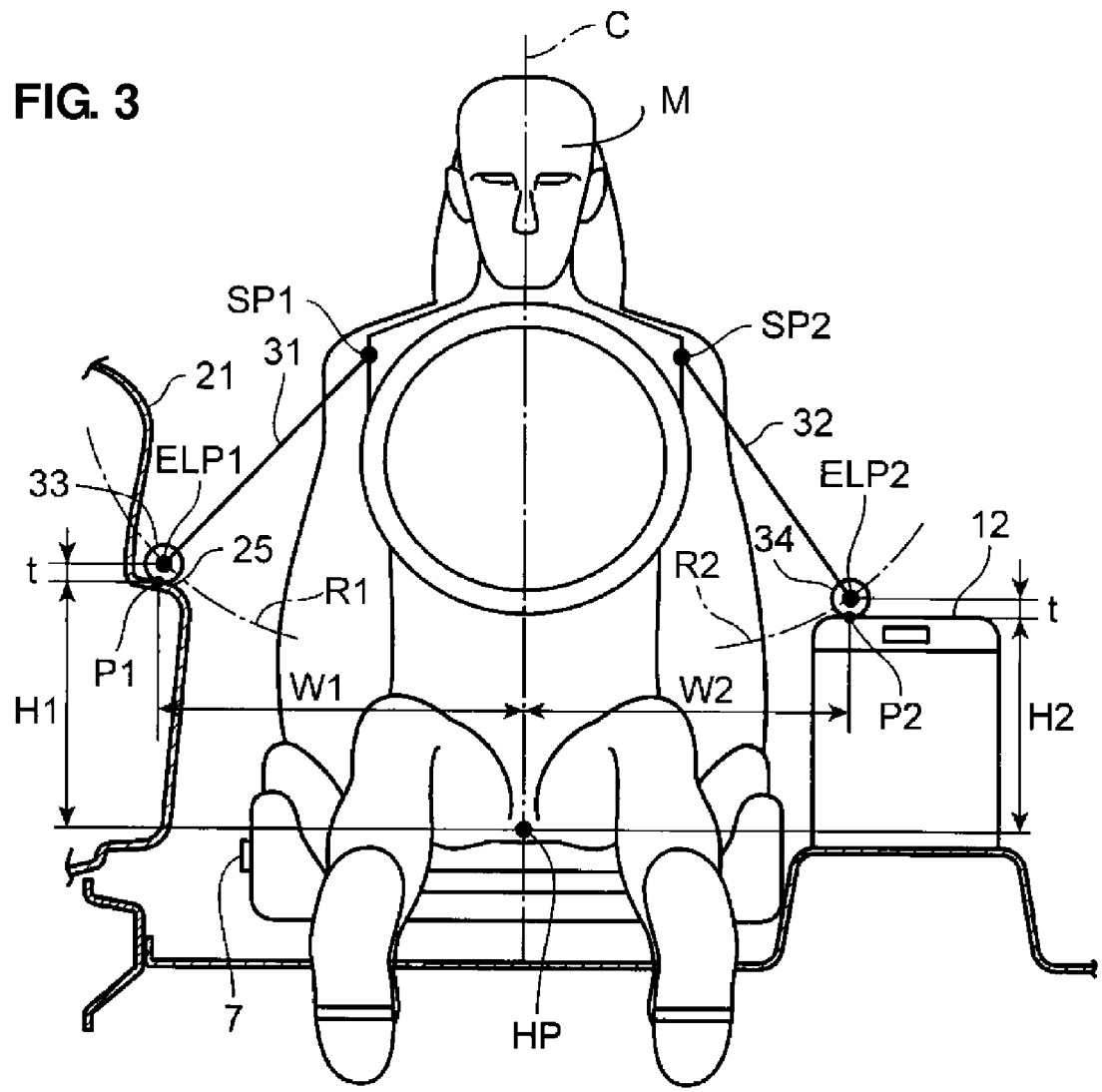
FIG. 3 is an elevational view schematically showing a state in which a passenger seated in a seat places elbows on armrests.

As shown in FIG. 3, one of the elbows (right-side elbow) 33 of the passenger M seated in the seat 1 is placed on an upper face of the shelf portion 25 of the door trim 20. That is, the self portion 25 formed at the door trim 20 is used as an armrest to support the elbow of the passenger M who takes a comfortable position. Hereinafter, the shelf portion 25 will be referred to as a door armrest 25. The door armrest 25 corresponds to a first armrest of the present invention.

Meanwhile, the other of the elbows (left-side elbow) 34 of the passenger M is placed on an upper face of the lid portion 12 of the center console 10. That is, the lid portion 12 functions not only as a lid to cover over the upper face of the console body 11 but as an armrest to support the elbow of the passenger M. Hereinafter, the lid portion 12 will be referred to as a center armrest 12. The center armrest 12 corresponds to a second armrest of the present invention.

Next, the position of the door armrest 25 (the first armrest) and the center armrest 12 (the second armrest) will be described specifically. In FIG. 3, reference character C denotes a vertically-extending seat center line passing a center of the seat 1 in a seat width direction, reference character P1 denotes a support position of the right-side elbow 33 of the passenger M at the door armrest 25, and reference character P2 denotes a support position of the left-side elbow 34 of the passenger M at the center armrest 12. Herein, according to the present embodiment, the respective armrests 25, 12 are configured such that a horizontal distance W1 between the seat center line C and the elbow's support position P1 at the door armrest 25 is greater than a horizontal distance W2 between the seat center line C and the elbow's support position P2 at the center armrest 12. Herein, the reason the horizontal distance W1 of the door armrest 25 is greater is that since the operational portion 7 is provided at the side face of the seat 1 which is located on the side of the side door 15, it is necessary to provide a sufficient space for operating the operational portion 7 between the seat 1 and the side door 15.

Herein, the elbow's support position P1 at the door armrest 25 is set at a slightly-inward position on the upper face of the door armrest 25, considering the width of the door armrest 25 and the size of the elbow 33 of the passenger M. Meanwhile, the elbow's support position P2 at the center armrest 12 is set at an offset position on the upper face of the center armrest 12 from its right-side end portion toward the center by about ¼ of the width of the center armrest 12. This is because an opposite position on the upper face of the center armrest 12 to the elbow's support position P2, i.e., an offset position on the upper face of the center armrest 12 from its left-side end portion toward the center by about ¼ of the width of the center armrest 12, may be used for supporting an elbow of a passenger seated in another adjacent seat to the seat 1 (a passenger's seat, i.e., an assistant's seat).

Meanwhile, respective heights H1, H2 of the door armrest 25 and the center armrest 12 are determined based on the body size of the passenger M seated in the seat 1. In the present embodiment, a body-size model of a so-called AM50 Model which is specified as an average body size of American male adults is used as the body size of the passenger M seated in the seat 1 to determine the heights H1, H2. And, the heights H1, H2 of the door armrest 25 and the center armrest 12 are set so that the passenger M having the AM50 Model can properly place the elbows on the door armrest 25 and the center armrest 12 when seated in the seat 1 with the body center of the passenger M matching the seat center line C. In an example shown herein, the heights H1, H2 of the door armrest 25 and the center armrest 12 are shown as respective heights of the elbow's support positions P1, P2 from a hip point (a center of buttocks) HP of the passenger M.

In FIG. 3, reference numeral 31 denotes an upper arm portion of the right-side arm of the passenger M (AM 50 Model), and reference numeral 32 denotes an upper arm portion of the left-side arm of the passenger M (AM 50 Model). Further, reference character SP1 denotes a shoulder position, around which the upper arm portion 31 of the right-side arm rotates in the vehicle width direction, and reference character SP2 denotes a shoulder position, around which the upper arm portion 32 of the left-side arm rotates in the vehicle width direction.

When using the door armrest 25 or the center armrest 12 as shown in the figure, the passenger M opens the upper arm portions 31, 32 and thereby moves the elbows 33, 34 in accordance with the position of the armrests 25, 12. That is, when using the door armrest 25, the passenger M places the elbow 33 on the door armrest 25, rotating the upper arm portion 31 in the vehicle width direction around the shoulder position SP1 of the right-side arm. Likewise, when using the center armrest 12, the passenger M places the elbow 34 on the center armrest 12, rotating the upper arm portion 32 in the vehicle width direction around the shoulder position SP2 of the left-side arm.

Herein, in order to properly support the elbows 33, 34 at the armrests 25, 12 and thereby make the position of the sated passenger M comfortable, it is necessary as shown in the figure that the respective heights H1, H2 of the armrests 25, 12 are set at respective levels corresponding to locus R1, R2 of rotational motions of the arm portions 31, 32. The locus R1 is formed by the right-side elbow 33 when the right-side upper arm portion 31 rotates in the vehicle width direction, and the locus R2 is formed by the left-side elbow 34 when the left-side upper arm portion 32 rotates in the vehicle width direction.

More specifically, the heights H1, H2 of the armrests 25, 12 are required to be set so that the elbow's support positions P1, P2 can be located at levels which are lower than respective points of the locus R1, R2 of the rotational motions of centers ELP1, ELP2 of the elbows 33, 34 by a thickness t of the elbows 33, 34. By setting the heights H1, H2 of the elbow's support positions P1, P2 at the armrests 25, 12 as described above, the passenger M can obtain the appropriate support feelings of the elbows 33, 34 at the armrests 25, 12 and take the comfortable position.

However, in a state in which the elbows 33, 34 of the passenger M are properly supported at the armrests 25, 12, the shoulders of the passenger M may be raised slightly (by about 40 mm, for example) by a reaction force of a load acting downwardly on the armrests 25, 12 from the elbows 33, 34. Considering this situation, the shoulder positions SP1, SP2 which become the centers in determining the locus R1, R2 of the rotational motions of the elbows 33, 34 are offset (about 40 mm) upwardly from those in their initial states in which the elbows 33, 34 are not placed on the armrests 25, 12. And, the heights H1, H2 of the elbow's support positions P1, P2 of the armrests 25, 12 are set at the levels corresponding to the locus R1, R2 determined with the centers of the upwardly-offset shoulder positions SP1, SP2 described above.

Herein, the positions of the door armrest 25 and the center armrest 12 in the vehicle width direction are set, as described, such that the horizontal distance W1 between the seat center line C and the elbow's support position P1 of the door armrest 25 is greater (longer) than the horizontal distance W2 between the seat center line C and the elbow's support position P2 of the center armrest 12. Further, according to this, the height of the elbow's support position P1 of the door armrest 25 is greater (higher) than that of the elbow's support position P2 of the center armrest 12 in the present embodiment. That is, since the heights of the armrests 25, 12 are set at the levels corresponding to the locus R1, R2 of the rotational motions of the elbows 33, 34 of the passenger M, the height H1 of the elbow's support position P1 of the door armrest 25 having the greater (longer) horizontal distance from the seat center line C is set to be greater (higher) than the height H2 of the elbow's support position P2 of the center armrest 12 having the smaller (shorter) horizontal distance from the seat center line C.

As described above, there are provided the door armrest 25 to support one of the elbows (the right-side elbow) of the passenger M seated in the seat 1 and the center armrest 12 to support the other elbow (the left-side elbow) of the passenger M in the vehicle compartment of the vehicle of the present embodiment. And, the armrests 25, 12 are configured such that the horizontal distance W1 between the seat center line C of the seat 1 and the elbow's support position P1 of the door armrest 25 is greater (longer) than the horizontal distance W2 between the seat center line C and the elbow's support position P2 of the center armrest 12, and the height H1 of the elbow's support position P1 at the door armrest 25 is greater (higher) than the height H2 of the elbow's support position P2 of the center armrest 12. According to this structure, the appropriate elbow's support feelings at the armrests 25, 12 can be ensured for the passenger M.

That is, since the height H1 of the door armrest 25 having the greater (longer) horizontal distance from the seat center line C is greater (higher) than the height H2 of the center armrest 12 having the smaller (shorter) horizontal distance from the seat center line C in the present embodiment, an appropriate difference in the height between the armrests 25, 12 can be provided in accordance with an increase of each height of the elbows 33, 34 when each outward angle of the upper arm portions 31, 32 of the seated passenger M opens widely. Accordingly, the elbows 33, 34 of the passenger M can be properly supported at the armrests 25, 12 regardless of the difference in the horizontal distance between the armrests 25, 12. Thereby, even when the passenger M places the elbows 33, 34 on any of the armrests 25, 12, the appropriate elbow's support feelings can be ensured for the passenger M and the passenger M can obtain a more comfortable position.

More specifically, in the present embodiment, the heights H1, H2 of the elbow's support positions P1, P2 at the door armrest 25 and the center armrest 12 are set at the levels respectively corresponding to the locus R1, R2 of the rotational motions of the upper arm portions 31, 32 of the passenger M. Herein, the locus R1, R2 are formed by the elbows 33, 34 when the upper arm portions 31, 32 rotate in the vehicle width direction around the shoulder positions SP1, SP2 of the passenger M. Thereby, the heights H1, H2 of the armrests 25, 12 can be set properly in accordance with the locus R1, R2 of the rotational motions of the passenger's upper arm portions 31, 32, so that the appropriate elbow's support feelings at the armrests 25, 12 can be ensured more properly.

Further, in the present embodiment, the operational portion 7 for seat-position adjustment is provided at the side face of the seat 1 which is located on the outside of the seat 1 in the seat width direction (on the side of the side door 15) where the door armrest 25 is provided, and the second armrest is located on the other side of the seat which is opposite to the operational portion for seat-position adjustment. Thereby, a neces-sary space for the passenger M operating the operational portion 7 for seat-position adjustment with a hand can be provided properly, ensuring the appropriate elbow's support feelings at the armrests 25, 12.

Here, a specific example as to how the difference of the above-described horizontal distances W1, W2 influences the difference of the heights H1, H2 of the armrests 25, 12 will be described. For example, in a case in which the horizontal distance W1 between the seat center line C of the seat 1 and the elbow's support position P1 at the first armrest 25 is set at 350 mm, while the horizontal distance W2 between the seat center line C and the elbow's support position P2 at the second armrest 12 is set at 320 mm in FIG. 3, a difference value (H1−H2) in the height between the armrests 25, 12 when the heights H1, H2 of the armrests 25, 12 are set in accordance with the locus R1, R2 of the rotational motions of the elbows 33, 34 of the passenger M having the body size of AM50 Model will be about 20 mm.

Herein, while the above-described example shows a case in which W1=350 mm, W2=320 mm, and the passenger M has the body side of AM50 Model, these distances W1, W2 or a body-size model adopted for the passenger M are changeable in accordance with the kinds of vehicle or markets. Accordingly, hereinafter, it will be tried to determine the difference value H1−H2 of the armrests 25, 12 by using a general expression including some variables representing the above-described horizontal distances W1, W2 and sizes of respective portions of the passenger M.

Figure 4:
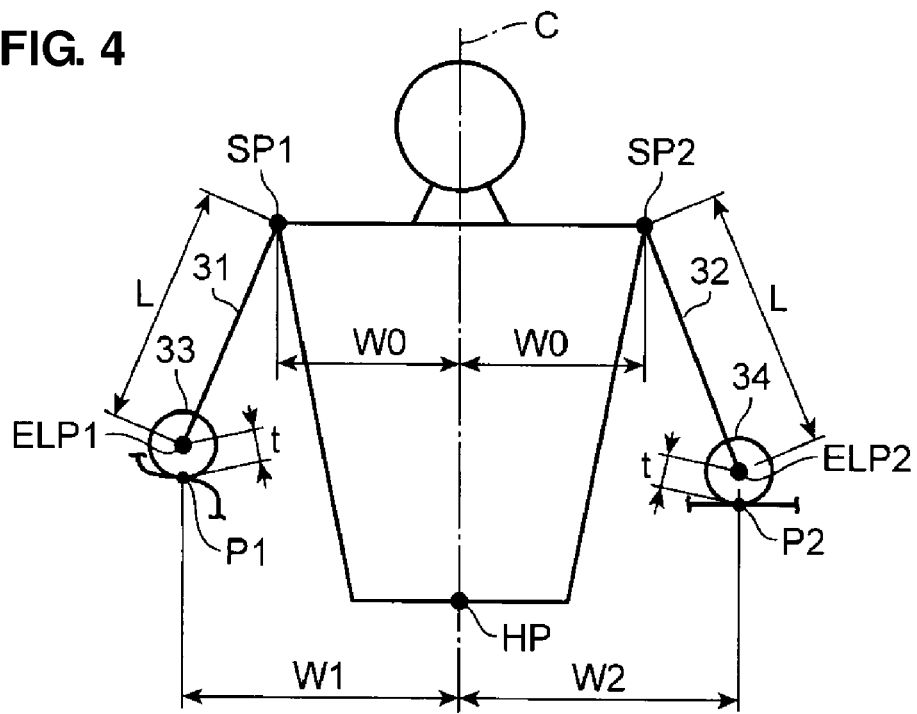
FIG. 4 is an elevational view of a model showing a position and a body size of the passenger seated.
Figure 5:
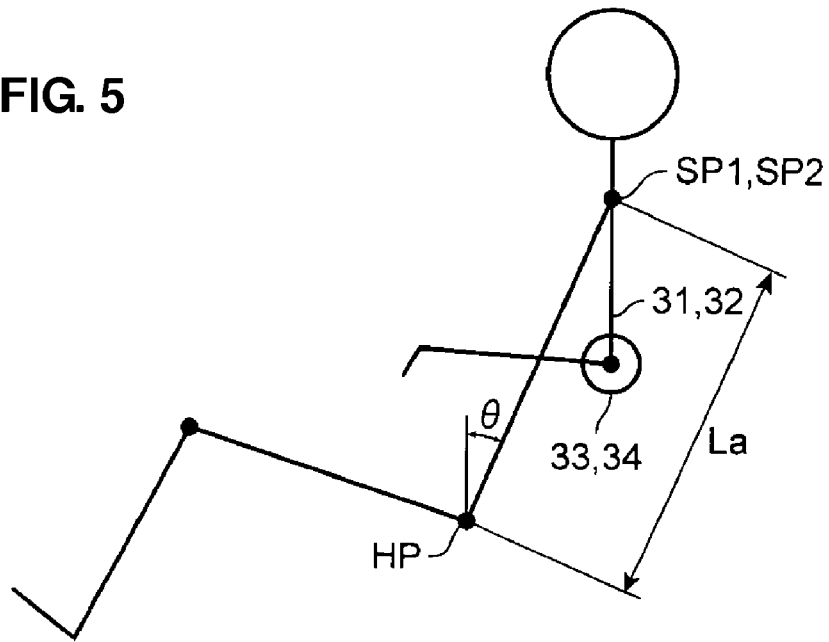
FIG. 5 is a side view of the model showing the position and the body size of the passenger seated.

FIGS. 4 and 5 are views of a model showing the passenger M seated in the seat 1 in a state in which the both elbows 33, 34 are placed on the armrests 25, 12. In these figures, reference character L denotes a length of the upper arm portion of the passenger M, reference character W0 denotes a horizontal distance between the seat center line C (the center of the body of the passenger M) and the both shoulder positions SP1, SP2, reference character La denotes a whole length of the upper-half body of the passenger M (a length between the hip point HP and the shoulder positions SP1, SP2), and reference character θ denotes a torso angle (a rearward-inclined angle of the upper-half body). The other dimensions (H1, H2, W1, W2 and t) are the same as those which have been explained above referring to FIG. 3.

According to FIGS. 4 and 5, the height H1 of the elbow's support position P1 of the door armrest 25 can be obtained from the following expression (2).

$$H1 = La \cdot \cos\theta - L \cdot \cos\left\{\sin^{-1}\left(\frac{W1 - W0}{L}\right)\right\} - t \qquad (2)$$

Meanwhile, the height H2 of the elbow's support position P2 of the center armrest 12 can be obtained from the following expression (3).

$$H2 = La \cdot \cos\theta - L \cdot \cos\left\{\sin^{-1}\left(\frac{W2 - W0}{L}\right)\right\} - t \qquad (3)$$

Accordingly, a height difference H1−H2 of the armrests 25, 12 can be obtained as a difference between the above-described expressions (2) and (3). Herein, errors within plus or minus 5 mm may be permitted for the difference between the above-described expressions (2) and (3), considering errors in manufacturing or the like. Consequently, the height difference H1−H2 can be expressed by the following expression (1).

$$H1 - H2 = L\left[\cos\left\{\sin^{-1}\left(\frac{W2-W0}{L}\right)\right\} - \cos\left\{\sin^{-1}\left(\frac{W1-W0}{L}\right)\right\}\right] \pm 5 \quad (1)$$

By determining the difference between the respective heights H1, H2 of the armrests 25, 12 based on this expression (1), the heights of the respective armrests 25, 12 can be set properly regardless of differences in the horizontal distances W1, W2 between the armrests 25, 12 or in the model to be used as the body size of the passenger M.

Lastly, some modifications of the above-described present embodiment will be described.

While no mechanism of adjusting the height of the door armrest 25 or the center armrest 12 which are provided on the both sides of the seat 1 is provided in the present embodiment, at least one of the armrests may have such a height adjusting mechanism.

For example, it can be considered that a height adjusting mechanism to adjust the height H2 of the center armrest 12 within a specified height range is provided at the upper face of the center armrest 12 so as to function as a lid portion of the center armrest 12 as well. In this case, it may be preferable that a highest position H2 of the center armrest 12 in the specified adjustable range be set at a level corresponding to the locus R2 of the rotational motion of the elbow 34 of the passenger M. Thereby, when the passenger M uses the center armrest 12, the height of the center armrest 12 can be easily adjusted to an appropriate position to support the passenger's elbow by the passenger M raising the armrest 12 up to the highest position, and when the center armrest 12 is not used, the center armrest 12 can be properly lowered so as not to hinder the passenger M in his/her driving.

Further, while the above-described embodiment shows one example in which the center armrest 12 provided on the upper face of the center console 10 corresponds to the second armrest (the armrest having the relatively shorter horizontal distance from the seat center line C) of the present invention, the second armrest should not be limited to this armrest but may be an armrest which is attached to the side face of the seatback 4 of the seat 1, for example. In this case, the horizontal distance from the seat center line C will be much shorter than the case of the center armrest 12, so that the height of the armrest will be required to be set at a much lower position.

Likewise, while the above-described embodiment shows the example in which the door armrest 25 provided at the door trim 20 corresponds to the first armrest (the armrest having the relatively longer horizontal distance from the seat center line C) of the present invention, another armrest than the door armrest 25 (an armrest which is attached to the side face of the seatback 4, for example) may be adopted as the first armrest.

Moreover, while the above-described embodiment explains how the heights H1, H2 of the both armrests 25, 12 are set for the case of the driver's seat 1, the present invention is applicable to any kind of seat as long as the armrests are provided on the both side of the seat.

What is claimed is:

1. An armrest structure for a vehicle, comprising:
   a first armrest to support an elbow of one of arms of a passenger seated in a seat, the first armrest being provided on one side of the seat in a seat width direction; and
   a second armrest to support an elbow of the other arm of the passenger seated in the seat, the second armrest being provided on the other side of the seat in the seat width direction,
   wherein said first and second armrests are configured such that a horizontal distance between a vertically-extending seat center line passing a center of the seat in the seat width direction and a support position of the elbow at the first armrest is greater than that between said vertically-extending seat center line and a support position of the elbow at the second armrest, and a height of the support position of the elbow at the first armrest is greater than that of the support position of the elbow at the second armrest, and
   wherein a height of each of said elbow's support positions at the first and second armrests is set at a level corresponding to a locus of a rotational motion of an upper arm portion of the arm of the passenger seated in the seat, the locus of the rotational motion of the upper arm portion of the passenger's arm being formed by the elbow when the upper arm portion of the passenger's arm rotates, in a vehicle width direction, around a shoulder position of the passenger seated in the seat.

2. The armrest structure for a vehicle of claim 1, wherein said first and second armrests are positioned such that a difference in height between the elbow's support position at the first armrest and the elbow's support position at the second armrest: H1−H2 (mm) is satisfied by the following expression (1), $$H1 - H2 = L\left[\cos\left\{\sin^{-1}\left(\frac{W2-W0}{L}\right)\right\} - \cos\left\{\sin^{-1}\left(\frac{W1-W0}{L}\right)\right\}\right] \pm 5 \quad (1)$$

wherein L is a length (mm) of the upper arm portion of the arm of the passenger seated in the seat, W0 is a horizontal distance (mm) between the vertically-extending seat center line and the shoulder position of the passenger seated in the seat, W1 is a horizontal distance (mm) between the vertically-extending seat center line and the elbow's support position at the first armrest, and W2 is a horizontal distance (mm) between the vertically-extending seat center line and the elbow's support position at the second armrest.

3. The armrest structure for a vehicle of claim 2, wherein AM50 Model (an average body size of American male adults) from body-model standards is used as a body size of the passenger seated in the seat.

4. The armrest structure for a vehicle of claim 1, wherein an operational portion for seat-position adjustment is provided at a side face of the seat which is located on said one side of the seat in the seat width direction where said first armrest is provided, and said second armrest is located on the other side of the seat which is opposite to said operational portion for seat-position adjustment.

5. The armrest structure for a vehicle of claim 1, wherein an operational portion for seat-position adjustment is provided at a side face of the seat which is located on said one side of the seat in the seat width direction where said first armrest is provided, and said second armrest is located on the other side of the seat which is opposite to said operational portion for seat-position adjustment.

6. The armrest structure for a vehicle of claim 2, wherein an operational portion for seat-position adjustment is provided at a side face of the seat which is located on said one side of the seat in the seat width direction where said first armrest is provided, and said second armrest is located on the other side of the seat which is opposite to said operational portion for seat-position adjustment.

7. The armrest structure for a vehicle of claim 3, wherein an operational portion for seat-position adjustment is provided at a side face of the seat which is located on said one side of the seat in the seat width direction where said first armrest is provided, and said second armrest is located on the other side of the seat which is opposite to said operational portion for seat-position adjustment.

8. The armrest structure for a vehicle of claim 1, wherein said first armrest is a door armrest provided at a door trim of a side door which is located on an outside, in a vehicle width direction, of the seat, and said second armrest is a center armrest provided at an upper face of a center console which is located on an inside, in the vehicle width direction, of the seat.

9. The armrest structure for a vehicle of claim 1, wherein said first armrest is a door armrest provided at a door trim of a side door which is located on an outside, in a vehicle width direction, of the seat, and said second armrest is a center armrest provided at an upper face of a center console which is located on an inside, in the vehicle width direction, of the seat.

10. The armrest structure for a vehicle of claim 2, wherein said first armrest is a door armrest provided at a door trim of a side door which is located on an outside, in a vehicle width direction, of the seat, and said second armrest is a center armrest provided at an upper face of a center console which is located on an inside, in the vehicle width direction, of the seat.

11. The armrest structure for a vehicle of claim 3, wherein said first armrest is a door armrest provided at a door trim of a side door which is located on an outside, in a vehicle width direction, of the seat, and said second armrest is a center armrest provided at an upper face of a center console which is located on an inside, in the vehicle width direction, of the seat.

12. The armrest structure for a vehicle of claim 4, wherein said first armrest is a door armrest provided at a door trim of a side door which is located on an outside, in a vehicle width direction, of the seat, and said second armrest is a center armrest provided at an upper face of a center console which is located on an inside, in the vehicle width direction, of the seat.

13. The armrest structure for a vehicle of claim 5, wherein said first armrest is a door armrest provided at a door trim of a side door which is located on an outside, in a vehicle width direction, of the seat, and said second armrest is a center armrest provided at an upper face of a center console which is located on an inside, in the vehicle width direction, of the seat.

14. The armrest structure for a vehicle of claim 6, wherein said first armrest is a door armrest provided at a door trim of a side door which is located on an outside, in a vehicle width direction, of the seat, and said second armrest is a center armrest provided at an upper face of a center console which is located on an inside, in the vehicle width direction, of the seat.

15. The armrest structure for a vehicle of claim 7, wherein said first armrest is a door armrest provided at a door trim of a side door which is located on an outside, in a vehicle width direction, of the seat, and said second armrest is a center armrest provided at an upper face of a center console which is located on an inside, in the vehicle width direction, of the seat.

16. The armrest structure for a vehicle of claim 1, wherein at least one of said first and second armrests is configured such that the height thereof is changeable within a specified adjustable range and a highest position in the specified adjustable range corresponds to said elbow's support position located on the locus of the rotational motion of the upper arm portion of the passenger seated in the seat.

17. A setting method of an armrest height for a vehicle which comprises a first armrest to support an elbow of one of arms of a passenger seated in a seat, the first armrest being provided on one side of the seat in a seat width direction, and a second armrest to support an elbow of the other arm of the passenger seated in the seat, the second armrest being provided on the other side of the seat in the seat width direction wherein said first and second armrests are configured such that a horizontal distance between a vertically-extending seat center line passing a center of the seat in the seat width direction and a support position of the elbow at the first armrest is greater than that between said vertically-extending seat center line and a support position of the elbow at the second armrest, and a height of the support position of the elbow at the first armrest is greater than that of the support position of the elbow at the second armrest, the setting method comprising:

setting a height of each of said elbow's support positions at the first and second armrests at a level corresponding to a locus of a rotational motion of an upper arm portion of the arm of the passenger seated in the seat, the locus of the rotational motion of the upper arm portion of the passenger's arm being formed by the elbow when the upper arm portion of the passenger's arm rotates, in a vehicle width direction, around a shoulder position of the passenger seated in the seat.

\* \* \* \* \*